Oct. 6, 1925.

E. V. ANDERSON

CONTROL VALVE

Filed Sept. 20, 1924

1,555,817

WITNESSES
J. Herbert Bradley.
C. R. Halbert.

INVENTOR
Edward V. Anderson
By Winter, Brown & Critchlow
His Attys.

Patented Oct. 6, 1925.

1,555,817

UNITED STATES PATENT OFFICE.

EDWARD V. ANDERSON, OF BELLE VERNON, PENNSYLVANIA, ASSIGNOR OF ONE-HALF TO CHARLES E. GOLDEN, OF CRAFTON, PENNSYLVANIA.

CONTROL VALVE.

Application filed September 20, 1924. Serial No. 738,845.

*To all whom it may concern:*

Be it known that I, EDWARD V. ANDERSON, a citizen of the United States, and a resident of Belle Vernon, in the county of Westmoreland and State of Pennsylvania, have invented a new and useful Improvement in Control Valves, of which the following is a specification.

This invention relates to valves, and particularly to the type known as check valves or that intended to permit free passage in one direction, but to prohibit flow in the opposite direction.

Valves of the type referred to are employed in installations of various kinds and many have been expressly designed for the special duty to be performed. It has been found that many valves otherwise satisfactory have been defective in that upon a sudden reversal or back flow of the normal direction of flow of the fluid controlled, the valve would seat or return to its closed condition rather tardily, especially if the valve were equipped with a cushioning means. This slowness in seating is particularly objectionable with valves located in the discharge lines of pumps, disastrous back-flow frequently occurring when the pumps are suddenly shut down, as well as in lines where water hammering must be substantially eliminated.

It is an object of the invention to provide a valve which is free of the objections above noted, which is simple in construction, easy and economical to manufacture, and which is highly effective wherever a valve which will quickly close immediately upon occurrence of back-flow of the fluid control is required.

It is a special object to provide a valve of this character which is particularly adapted for use in discharge lines of pumps to prevent disastrous back-flow when the pumps are suddenly shut down, and in lines necessitating the prevention of disastrous water hammering or shock in the event of a sudden reversal of flow from any cause.

It is still a further special object to provide a valve in which the members assisting in the quick closure thereof will be disposed while the valve is in open condition in such position as not to obstruct normal flow therethrough but will nevertheless be responsive to cause closing of the valve immediately back-flow of the fluid occurs, and will be moved during the closing movement of the valve to gradually reduce its tendency to close the valve whereby to permit the valve head to seat easily and without undue shock.

Figure 1:
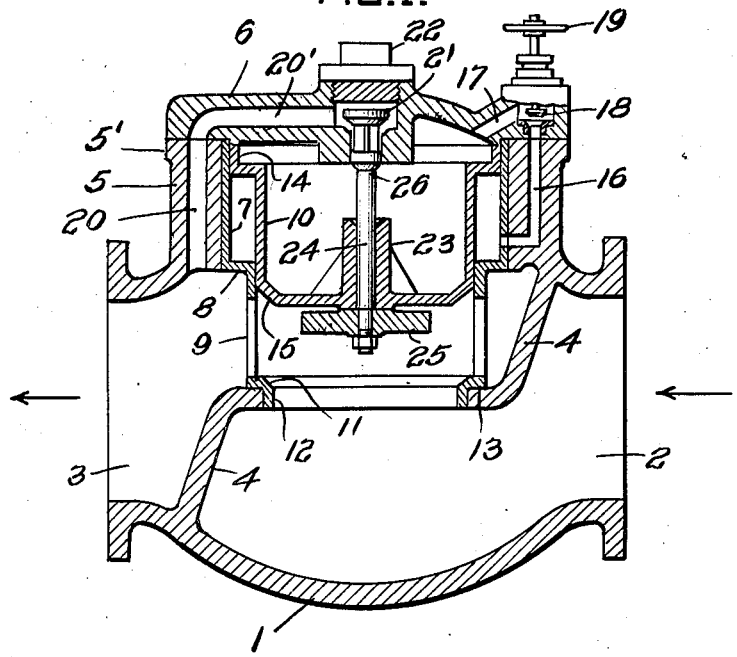
Figure 2:
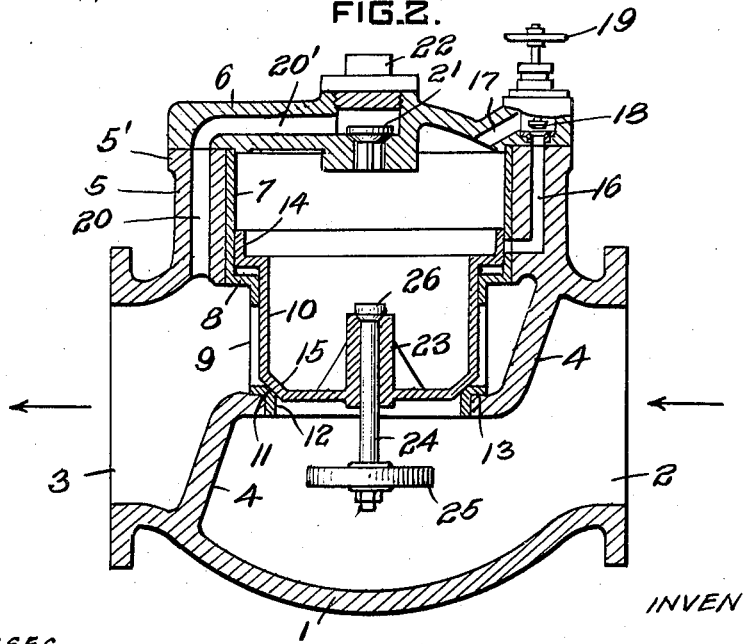

In the accompanying drawings Fig. 1 is a vertical sectional view through the preferred embodiment of the invention, showing the relative positions which the parts assume when the valve is open; and Fig. 2 is a view similar to Fig. 1 in which the parts are shown with the valve in closed condition.

The main valve casing is indicated at 1 having the usual inlet 2 and outlet 3 and the ported partition 4 interposed therebetween, the several parts cooperating to afford a free passage through the casing when the valve is in full open condition. The casing 1 is provided with a cylindrical enlargement 5 at its upper portion equipped with the top supporting flange 5', this enlargement being located at one side of the main passage through the valve casing and being closed by a top 6. Fitting within the cylindrical enlargement 5 is a lining 7 which not only extends the full height of the enlargement 5 but is offset at the point 8 corresponding to the side of the main passage through the valve and is extended downwardly as shown at 9 providing a guide cage for the hollow cylindrical piston 10. The extreme lower portion of the combined lining and cage 7—9 is in the form of a valve seat 11 the depending flanged portion 12 of which is adapted to fit within the opening formed in the partition 4. The dimensions of the parts are such that the distance between the shoulder 13 immediately adjacent the upper portion of the depending flange 12 and the extreme upper end of the lining 7 corresponds to the distance between the upper face of the partition immediately adjacent the port therethrough and the upper face of the flange 5' of the cylindrical enlargement. It is thus seen that contact of the top 6 with the upper edge of the lining will readily position and hold the combined lining and guiding cage in proper operative position.

The upper portion of the hollow piston 10 is enlarged as shown at 14, said upper enlarged portion neatly fitting the interior of the chamber 5, while the lower portion of the piston comprises a valve head provided with a bevelled face 15 adapted to cooperate with a correspondingly bevelled face on the seat 11. As clearly shown in Fig. 2, the enlarged portion 14 of the piston is spaced a slight distance above the offset 8 when the valve is in closed condition, that is, the enlarged portion 14 does not move into contact with the offset 8 even when the valve has been moved to its full closed condition. Leading from a point near the inner end of the cylindrical enlargement or chamber 5 is a duct 16 which communicates with a duct 17 formed at one side of the top cap 6, the combined ducts 16, 17 establishing communication between the upper and lower portions of the said chamber. Interposed between the said ducts is a control valve 18 adapted to be actuated through means of the hand wheel 19.

The enlargement 5 is also provided with a duct 20 leading from the discharge side of the partition 4 and communicating with a duct 20', forming a continuation of duct 20, opening into the top of the piston chamber. A check valve 21 is interposed in the duct 20' and cooperates with a suitable seat therein. The valve 21 opens in a direction to permit ready escape of the fluid confined above the piston during opening movement of the main valve. To provide means for inserting the valve 21 in place and for permitting access thereto, when desired, the top of the casing is equipped with a screw plug 22.

Slidingly fitting a cylindrical guiding sleeve 23 on the piston is a stem 24 carrying at its opposite ends the impact disk 25, suitably bolted thereto, and the head 26. Preferably the head 26 is in the form of an auxiliary valve provided with a valve seat cooperating with a seat at the upper end of the bore of the sleeve 23, and is so disposed and of such size as to enter and partially close the entrance to duct 20' when in its raised position whereby to assist in cushioning the movement of the main valve near the limit of its upward travel. The size of the disk 21 is sufficient to render the same readily responsive to the flow of the fluid through the valve.

In operation, the piston 10 is raised and the valve head lifted from its seat under the influence of the fluid controlled, the pressure of the fluid beneath the piston serving to initiate its upward movement which is assisted by the impact of the fluid against the impact disk 25.

During opening movement of the valve the impact disk is lifted from the position of Fig. 2 to that of Fig. 1 and during the greater portion of the upward travel of the piston the fluid in the chamber 5 above the piston is permitted to freely escape through the check valve 21 and the ducts 20' and 20. However, after the piston is raised sufficiently for the head 26 to enter the duct 20', the fluid trapped above the piston is forced to flow through the ducts 17—16, into the space between the enlarged portion 14 and the offset 8 thereby serving to cushion the movement of the valve, the rate at which the fluid is transferred through the said ducts being controlled by the degree of opening of the valve 18. In the open condition of the main valve, the piston and impact disk are positioned at one side of the valve casing thereby passage through the valve casing thereby permitting free flow therethrough. The relative positions which the parts thus assume are clearly shown in Fig. 1.

During the closing movement of the valve, the parts move from the positions shown in Fig. 1 to those shown in Fig. 2, during which fluid is transferred from the space between the enlarged portion 14 of the piston and the offset 8 through the ducts 16, 17, to the space above the piston, which in conjunction with the fluid trapped within the space immediately below the lower extremity of the duct 16 and the offset 8 serves to cushion the valve as it approaches its lowermost limit of travel.

During the normal open position of the valve, with the piston 10 in its raised condition, as shown in Fig. 1, the impact disk 25 is disposed immediately below the main valve and spaced slightly therefrom due to the contact of the central boss of the disk against the body of the valve. Should a sudden back-flow of the fluid occur for any reason, the fluid will directly impinge upon the upper surface of the disk first causing the disk to descend and then forcing the piston 10 with it to positively move the main valve to its closed condition. As the piston 10 descends, the disk 25 is moved downwardly and somewhat out of the direct path of travel of the fluid through the main valve port, consequently diminishing its closing influence upon the valve as the valve head approaches its seat, and in this way permits the valve to be cushioned during its seating in spite of the strong downward pull initially exerted to effect closing movement thereof. When the disk 25 is in its lowered position the head 26 cooperates with the seat at the end of the bore through the guiding sleeve 23 to prevent leakage therethrough in an obvious fashion. It is to be especially noted that the influence exerted by the disk 25 to initiate closing movement of the valve is exerted due to the impact of the backwardly flowing fluid and not merely in response to the reduction in pressure at the inlet side of the valve, the main valve, however, having a tendency to move to its closed position upon occurrence of such reduced pressure.

It is thus seen that the nvention provides a valve device which in its normal open condition offers substantially free passage for the flow of the fluid therethrough, but upon a sudden reversal of such flow that is, upon a back-flow thereof, the valve will immediately respond to such back flow and move to its closed condition under the influence of the impact exerted thereby. It is also seen that the invention provides a valve device which is extremely simple and compact in construction, which is easy and economical to manufacture, and which is particularly effective for use in conjunction with the discharge lines of pumps as well as in pipes in which it is imperative to eliminate disastrous water hammering and shocks in the event of sudden reversals of flow of the fluid controlled.

Although the invention has been described and illustrated in its preferred form, as required by the patent statutes, it is obvious that many details in the construction and arrangement of the several parts may be made without departing from the spirit of the invention. It is therefore not intended to limit the invention beyond that particularly pointed out and defined by the appended claims.

I claim:

1. A valve comprising a casing provided with a passage therethrough, a valve head adapted to close said passage, and an impact member bodily supported by said valve head, the impact member being mounted for movement relatively to the valve head and adapted to traverse the path of the fluid through the said passage.

2. A valve comprising a casing provided with a passage therethrough, a valve head opening in the direction of normal flow through the casing for closing said passage, and an impact disk carried by said valve head, said disk being mounted for bodily movement with respect to the valve head, said disc being adapted to traverse the path of the fluid and exert a pull tending to close the valve head upon a reversal of flow through the said passage.

3. A valve comprising a casing provided with a passage therethrough, a valve head opening in the direction of normal flow through the casing adapted to close said passage and an impact disk slidingly mounted on but spaced from said valve head, said disk being so disposed as to move in the path of travel of the fluid through the valve.

4. A valve comprising a casing provided with a port having a passage therethrough, a ported partition in the casing, a valve head disposed at one side of the partition for closing the said port, and an independently movable impact disk capable of bodily movement through said port carried by the said head and disposed at the opposite side of the partition when the said valve head is in closed position.

5. A valve comprising a casing provided with a passage therethrough, a valve head adapted to close said passage, said valve head having a guide opening, a stem mounted for bodily sliding movement in said opening, and an impact disk fixed to the said stem disposed in the path of travel of the fluid flowing through the said passage.

6. A valve comprising a casing having an enlargement at one side of the passage therethrough, a ported partition in the casing, a piston mounted in the enlargement provided with a valve head adapted to close the port in the partition, a duct connecting the space above the piston with the said passage at the discharge side of the partition, a check valve controlling flow through the said duct, said valve head being provided with a guide opening, a stem mounted for bodily sliding movement in said opening, an impact disk carried at one end of the stem, the opposite end of the stem extending into the space above the piston and adapted to enter the said duct when the piston approaches the limit of its upward travel.

7. A valve comprising a casing provided with a passage therethrough, a valve head adapted to close said passage, and an impact member carried by and depending from said valve head, the impact member being mounted for bodily movement relatively to the valve head and adapted to traverse the path of the fluid through the said passage.

8. A valve comprising a casing having an inlet and an outlet, a partition interposed therebetween, provided with a port, a valve head adapted to close said port, and an impact member capable of bodily movement through the said port, said member being mounted for bodily movement relatively to the valve head and adapted to urge said valve towards said port upon a reversal in the direction of normal flow of fluid through the said casing.

9. A valve comprising a casing provided with a passage therethrough, a valve head opening under the influence and in the direction of normal flow of fluid through said passage, and an impact member associated with said valve head and mounted for bodily movement relatively thereto, said impact member being adapted to traverse the path of fluid through the said passage.

10. A valve comprising a casing provided with a passage therethrough, a valve head adapted to close said passage, said valve head having a guide opening, a stem mounted for bodily sliding movement in said opening, a pair of spaced abutments on said stem at opposite sides of said valve head, one of said abutments being in the form of an impact disc disposed in the path of travel of the fluid through the said passage.

11. A valve comprising a casing provided with a passage therethrough, a valve head adapted to close said passage, and an impact member capable of bodily movement relatively to the valve head, said valve head and said impact member being so mounted as to tend to move at all times in the same direction under the influence of flow of fluid through said passage.

In testimony whereof, I sign my name.

EDWARD V. ANDERSON.